E. SAMUEL.
TRACK STRUCTURE.
No. 11,483. Reissued Apr. 2, 1895.
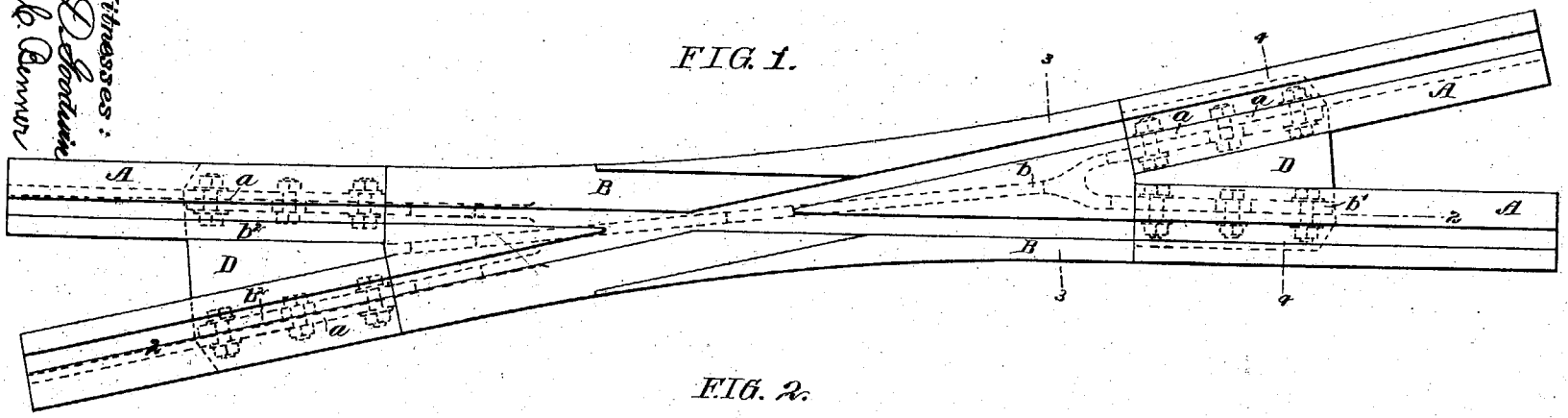
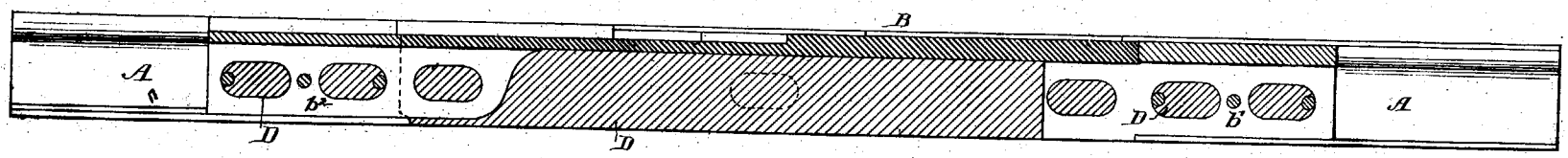
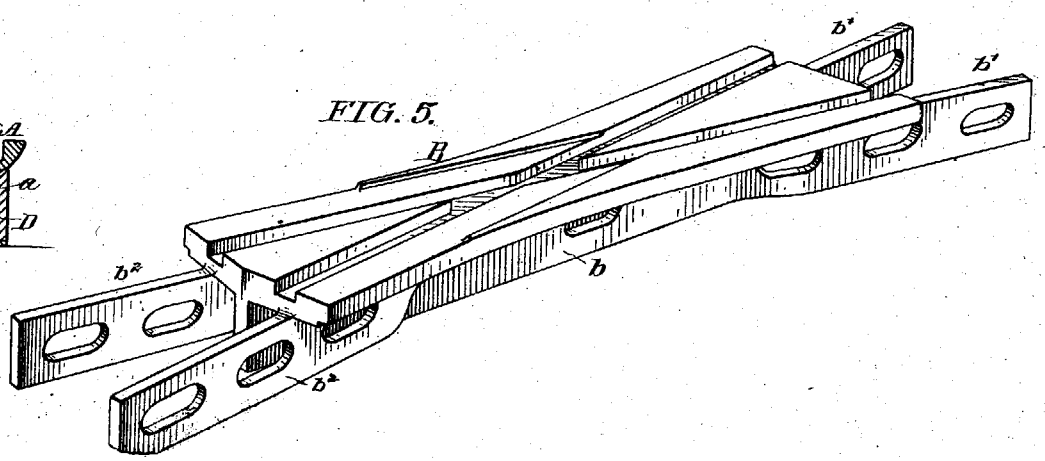
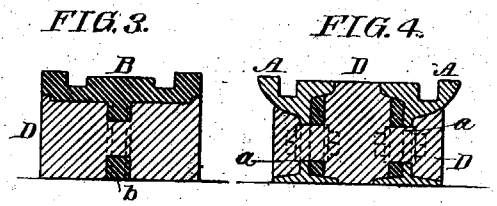
Witnesses:
F. D. Goodwin
F. C. Benner
Inventor:
Edward Samuel
by his Attorneys
Howson & Howson
THE ECKERT LITHOGRAPHING CO. WASHINGTON, D. C.

UNITED STATES PATENT OFFICE.

EDWARD SAMUEL, OF PHILADELPHIA, PENNSYLVANIA, ASSIGNOR TO THE WILLIAM WHARTON, JR., & COMPANY, INCORPORATED, OF SAME PLACE.

TRACK STRUCTURE.

SPECIFICATION forming part of Reissued Letters Patent No. 11,483, dated April 2, 1895.

Original No. 534,972, dated February 26, 1895. Application for reissue filed March 12, 1895. Serial No. 541,518.

*To all whom it may concern:*

Be it known that I, EDWARD SAMUEL, a citizen of the United States, residing in Philadelphia, Pennsylvania, have invented certain Improvements in Track Structures, of which the following is a specification.

The object of my invention is to provide a frog, switch or other rail structure with an independent special shape forming a continuation of the wearing portion of the rails and preferably of metal having greater durability than the rails, and this object I attain by securing the metal center piece to the rails by cast metal, forming an integral structure.

Referring to the accompanying drawings, Figure 1, is a plan view of a railway frog made in accordance with my invention. Fig. 2, is a longitudinal sectional view on the line 2—2, Fig. 1. Fig. 3, is a transverse sectional view on the line 3—3, Fig. 1. Fig. 4, is a transverse sectional view on the line 4—4, Fig. 1. Fig. 5, is a perspective view of the center or crossing piece.

While I have illustrated my invention in connection with a crossing frog, it will be understood that it can be applied to switches, switch mates, crossings, or analogous rail structures.

My present invention is based upon the patent granted to me on the 5th day of June, 1894, for railway track structures, No. 521,004, the cast metal in its fluid state passing through openings in the sections, my present invention being restricted to the union of one or more independent shapes to the rails by the cast metal and to the insertion of one or more shapes having greater durability than the rails.

Referring to Fig. 1, A are the rail sections which have one or more perforations *a* in their webs, and B, in the present instance, is the independent shape in the form of a crossing piece, made preferably of metal of greater durability than the rails This crossing piece B has a web *b* and extensions $b'$, $b^2$, to which the rails are secured by bolts. The web and extensions are perforated at intervals to allow the molten metal to pass therethrough. The center piece and rails are properly adjusted and secured together by the bolts and mounted in the mold, and the cast metal D is so poured that it will flow around and through a portion of the web of each rail and the web and extensions of the center piece.

When the casting is cooled the integral structure is removed from the mold, the rail sections and center piece being firmly attached in their respective positions to the casting.

The center piece may be made in some instances without the extensions, the rails being adjusted in line with the center piece and clamped to the mold, but I prefer to bolt the rails and center piece together, as by this means the parts can be adjusted accurately before the cast metal is poured, thus dispensing with special clamps. The molten metal flows around the bolts and nuts preventing their becoming loose and thus adding materially to the strength of the structure.

I claim as my invention—

1. As a new article of manufacture, a frog or other rail structure consisting essentially of a center piece and rail sections forming extensions of the center piece and secured thereto by cast metal passing through the rails and center piece, substantially as described.

2. As a new article of manufacture, a frog or other rail structure consisting essentially of a center piece having one or more webs, and rail sections forming extensions of the center piece and secured thereto by cast metal passing through openings in the rails and the webs of the center piece, substantially as described.

3. As a new article of manufacture, a frog or other rail structure, consisting essentially of a center piece having one or more webs or extensions, and rail sections secured to said webs or extensions by bolts and by cast metal, substantially as described.

4. The process herein described of making integral structures, said process consisting in first making a special shape, having one or more webs or extensions, second securing rail sections to said extensions by bolts, and third casting molten metal around the webs of the rails and shape, substantially as described.

In testimony whereof I have signed my name to this specification in the presence of two subscribing witnesses.

EDWARD SAMUEL.

Witnesses:
WILL. A. BARR,
JOSEPH H. KLEIN.